US012775465B2

(12) United States Patent
Fons Lluis et al.

(10) Patent No.: US 12,775,465 B2
(45) Date of Patent: Oct. 27, 2026

(54) DEVICE AND A METHOD FOR A GATEWAY CONTROLLER OF USER EQUIPMENT

(71) Applicant: Yinwang Intelligent Technologies Co., Ltd., Shenzhen (CN)

(72) Inventors: Francisco Fons Lluis, Munich (DE); Haigang Zhang, Hangzhou (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 221 days.

(21) Appl. No.: 18/745,783

(22) Filed: Jun. 17, 2024

(65) Prior Publication Data

US 2024/0338218 A1 Oct. 10, 2024

Related U.S. Application Data

(63) Continuation of application No. PCT/EP2021/085787, filed on Dec. 15, 2021.

(51) Int. Cl.
*G06F 9/30* (2018.01)

(52) U.S. Cl.
CPC ................................ *G06F 9/30181* (2013.01)

(58) Field of Classification Search
CPC .................................................... G06F 9/30181
See application file for complete search history.

(56) References Cited

U.S. PATENT DOCUMENTS

| | | | | |
|---|---|---|---|---|
| 7,047,394 | B1 * | 5/2006 | Van Dyke | G06F 9/30123 712/E9.035 |
| 2012/0263462 | A1 * | 10/2012 | Koren | H04L 45/60 398/45 |
| 2017/0072876 | A1 * | 3/2017 | Rajan | H04L 12/66 |

(Continued)

FOREIGN PATENT DOCUMENTS

| | | | |
|---|---|---|---|
| WO | 0219098 | A1 | 3/2002 |
| WO | 2021190746 | A1 | 9/2021 |

(Continued)

OTHER PUBLICATIONS

Autosar, "Specification of PDU Router," V2.3.0 R3.0 Rev 7, Total 113 pages (Sep. 20, 2010).

(Continued)

*Primary Examiner* — Minh Chau Nguyen
(74) *Attorney, Agent, or Firm* — Leydig, Voit & Mayer, Ltd.

(57) ABSTRACT

A device is configured to receive one or more input frames of bits, where the one or more input frames comprise data and instruction information that indicates one or more processing tasks to be executed on the data. Further, the device is configured to convert the instruction information into one or more Reduced Instruction Set Computer (RISC) instructions or one or more Complex Instruction Set Computer (CISC) instructions, where the one or more RISC instructions are selected from an RISC instruction set, and the one or more CISC instructions are selected from an CISC instruction set. The device is configured to execute the one or more processing tasks on the data of the one or more input frames based on the one or more RISC instructions or the one or more CISC instructions.

19 Claims, 11 Drawing Sheets

(56) References Cited

U.S. PATENT DOCUMENTS

2023/0168892 A1* 6/2023 Wang .................. G06F 15/7807
712/220

FOREIGN PATENT DOCUMENTS

WO 2022122171 A1 6/2022
WO 2022262968 A1 12/2022

OTHER PUBLICATIONS

Gurevich et al., "P416 Programming for Intel Tofino using Intel P4 Studio," Intel Connectivity Academy, Total 40 pages (May 21, 2021).
Agrawal et al., "Intel Tofino2-A 12.9Tbps P4-Programmable Ethernet Switch," Intel Corporation, Intel Hot Chips, Total 32 pages (Oct. 13, 2020).

* cited by examiner

DEVICE AND A METHOD FOR A GATEWAY CONTROLLER OF USER EQUIPMENT

CROSS-REFERENCE TO RELATED APPLICATIONS

This application is a continuation of International Application No. PCT/EP2021/085787, filed on Dec. 15, 2021, the disclosure of which is hereby incorporated by reference in its entirety.

FIELD

The present disclosure relates to a gateway controller of user equipment (UE), for example, a gateway controller of a vehicle. The disclosure provides a device and a corresponding method for the gateway controller. The device may be adapted to perform matching and action (M&A) processing on one or more input frames including data. The device is designed to use instructions from a Reduced Instruction Set Computer (RISC) instruction set or a Complex Instruction Set Computer (CISC) instruction set to instruct the execution of one or more processing tasks on the data.

BACKGROUND

Nowadays, the automotive electronics industry is immersed in a deep transformation in response to the new era of mobility. For example, the industry is in search of the future autonomous, connected, electric, and shared vehicle.

Triggered by this transformation, the automotive electrics/electronics (E/E) & in-vehicle networking (IVN) architectures of vehicles are already transitioning from a domain-based approach—which includes splitting the functionality of the vehicle in a logical way through functional domains—to a new approach that is driven by a zonal distribution, wherein mixed functions of whatever domain coexist in each physical zone of the vehicle.

An immediate impact of the transition of the E/E IVN architecture is the role to be played by the gateway in the vehicle, and by consequence of the gateway controller. Two new types of controllers or electronic control units (ECUs) emerge for this purpose: high-performance computers (HPC) and zonal gateway controllers (also referred to as Input/Output (I/O) hub module).

In the conventional domain-based E/E architecture, the gateway controller deploys the role of a central gateway, which is responsible for interconnecting different domain controllers (e.g., advanced driver-assistance systems (ADAS), infotainment, body, cockpit, energy management, etc.) through a network backbone like automotive Ethernet. In the new zonal-based architecture, the complete vehicle functionality is redistributed not through domain controllers, but in one or more central computers and several zonal gateway controllers. For example, one zonal gateway controller may be used per each physical zone of the vehicle. Due to this new architectural approach, the zonal gateway controller is becoming more and more a key piece of the vehicle infrastructure.

This disclosure focuses on the design of and new technologies for a zonal gateway controller.

SUMMARY

Gatewaying is a complex and high demanding processing task. The role, which is assigned to a zonal gateway controller of a gateway, includes the management of both power and communications of one specific physical zone of the UE (e.g., vehicle). This management may, for instance, be based on sensors, actuators, and smaller ECUs, which are distributed in that zone. The gateway controller can take charge of receiving and sending frames from ingress ports to egress ports, for example, by encapsulating, aggregating and/or processing protocol data units (PDUs) or data frames according to different networking protocols and standards, which are in line with the network open systems interconnection (OSI) model.

As shown in FIG. 1, the gateway controller may thus be responsible for tunneling data from one network to another and, more and more, this processing needs to be performed at ultra-low latency. Therefore, the gateway controller is becoming a key element of the automotive IVN infrastructure, in which many heterogeneous network technologies (based on different network protocols) coexist.

The gateway and its gateway controller(s) are complex networking devices in terms of functionality and technologies integrated inside. For instance, it has a higher level of integration than other devices, like routers or switches. Automotive communication and computation solutions—although inspired in the software defined vehicle (SDV) concept and methodology—go through a design of customized systems on chip (SoC). The present disclosure relates to the development of new networking technology, which is embeddable into future gateway SoC devices.

The present disclosure describes a new concept of a networking SoC device for use as the next generation of automotive gateway controllers. The new concept may be integrated in future automated, connected, electric, and shared (ACES) vehicles. The novel aspects described herein may be referred to as an elastic gateway (eGW), and may operate as a zonal gateway controller, which is schematically illustrated in FIG. 2.

The present disclosure includes the "Filtering and Policing" and "Gatewaying" processing stages of the exemplary gateway controller shown in FIG. 2, wherein these stages may also be referred to as an M&A processing stage 201. The "Filtering and Policing" stage may be referred to as a matching processing stage, and the "Gatewaying" stage may be referred to as an action processing stage.

Conventional solutions for the zonal-based gateways are either software (SW) centric or based on programmable data planes, and are either not able to embed all functions that a gateway controller demands, or the performance these solutions deliver is not good enough, or the complexity of these solutions is extremely high so that they are not well scalable.

The present disclosure describes solutions to overcome the above described disadvantages of conventional solutions. For example, the present disclosure enables an efficient synthesis and integration of action processing functions or M&A processing functions in a gateway controller. The present disclosure aims for a hardware (HW) and SW based approach.

The present disclosure employs CISC or RISC technology for integrating at least the action processing functions, or M&A processing functions, into a gateway controller, especially into the eGW SoC device shown in FIG. 2.

A first aspect of the present disclosure provides a gateway controller of a UE, the device comprising processing circuitry configured to: receive one or more input frames of bits, wherein the one or more input frames comprise data and comprise instruction information that indicates one or more processing tasks to be executed on the data; convert the instruction information into one or more RISC instructions or CISC instructions selected from a RISC instruction set or a CISC instruction set, respectively; and execute the one or more processing tasks on the data of the one or more input frames based on the one or more RISC instructions or CISC instructions.

The device of the first aspect enables an efficient synthesis and integration of at least the action processing functions of an M&A processing stage into the gateway controller. The gateway controller may be a zonal gateway controller of a vehicle, for example, it may be the gateway controller shown in FIG. 2.

In an embodiment, the functions of the device of the first aspect may be implemented, at least partly, by HW. By using the RISC or CISC technology, i.e. the RISC and CISC instructions, the complexity of the device can be held low, so that the device is also scalable. Further, the device of the first aspect allows a high number of embedded heterogeneous functionalities based on the use of the RISC or CISC instruction sets. For instance, the processing tasks that may be instructed may include one or more of: routing and/or forwarding data; firewalling; deep packet inspection of data packets; encryption and/or decryption of data; tunneling (encapsulation and/or decapsulation of data); traffic shaping; and time sensitive networking. The device of the first aspect also has a high flexibility, since by changing the RISC or CISC instruction set, functionalities can be easily added or changed.

In an implementation form of the first aspect, the processing circuitry comprises: a processor configured to convert the instruction information of the input frame into the one or more RISC instructions or CISC instructions; and one or more hardware accelerators (HWAs) configured to execute the one or more processing tasks on the data of the one or more input frames based on the one or more RISC instructions or CISC instructions received from the processor.

The device of the first aspect may thus at least partly employ a HW based solution, using the processor and the HWAs as coprocessors, and may not be purely SW based. The performance of the device of the first aspect may be higher than a purely SW based solution.

In an implementation of the first aspect, the processor is configured to provide a plurality of RISC instructions or a plurality of CISC instructions in parallel to a plurality of HWAs.

In this way, the device can exploit the advantages of parallelism based on a HW implementation, which improves the performance of the device.

In an implementation of the first aspect, the processor is configured to, based on the one or more RISC instructions or CISC instructions: schedule the execution of the one or more processing tasks by the one or more HWAs; and/or select, for each respective HWA of the one or more HWAs, one input frame of a subset of the input frames allocated to the respective HWA, to execute a processing task on the data of the selected input frame.

The processor is thus highly flexible with respect to scheduling and controlling the processing tasks that are executed on the data. The processor also has flexibility in selecting the HWAs respectively for performing certain processing tasks.

In an implementation of the first aspect, the processor is configured to schedule the execution of the one or more processing tasks and/or select the one input frame for each respective HWA, by controlling one or more first multiplexers of the processing circuitry, wherein each first multiplexer is associated with one HWA, and wherein the one or more first multiplexers are controlled by one or more bits of the RISC instructions or CISC instructions.

As a HW based approach is used for the scheduling and/or selecting, based on the processor controlling the first multiplexers (explained in more detail below with reference to FIG. 4), the performance and speed of the device may be improved.

In an implementation of the first aspect, the processor is configured to control a movement of the processed data, which results from executing the one or more processing tasks on the data of the one or more input frames, by controlling one or more second multiplexers of the processing circuitry, wherein each second multiplexer is associated with one or more HWAs, wherein the one or more second multiplexers are controlled by one or more bits of the RISC instructions or CISC instructions, and wherein the processed data is either moved towards an egress port of the device or is moved to one of the HWAs as data of another input.

The processed data may be moved to one of the HWAs as data of another input according to a pipeline approach. The processor may provide a loopback capability (illustrated in more detail below with reference to FIG. 4), wherein the processor may move processed data frames back to the HWAs, or forth to the next stage of the gateway controller, with nearly zero time overhead. This may be supported by internal priority handling of frames and inherent parallelism and the pipelining approach controlled by the processor using the RISC or CISC instructions.

In an implementation of the first aspect, the one or more HWAs are configured to sequentially execute two or more processing tasks on the data of the one or more input frames based on the one or more RISC or CISC instructions received from the processor.

There may be a multiplexer in every output of the HWAs, in order to permit moving the resultant processed frame either forth towards the egress ports/output of the device (e.g., to a next processing stage of the gateway controller), or to recirculate that resultant frame back to the M&A processing stage, i.e., to use it again as input frame of the HWAs. With this possibility of loopback, the resultant frame can be reinjected and pipelining of the processing tasks to be performed on the same data or frame may be realized. Accordingly, several actions (processing tasks) may be sequentially executed on a given input frame, one action after the other, when such a sequential execution is required. The output multiplexers are also managed by the RISC or CISC instructions. This implementation adds flexibility in processing the data more than once, for instance, by different HWAs dedicated to different processing tasks, and allows exploiting both parallelism and pipelining (i.e., a serial execution of processing tasks) to any data frame.

In an implementation of the first aspect, the processor comprises a RISC-V processing unit configured to convert the instruction information into the one or more RISC instructions, which are selected from a RISC-V instruction set.

In an implementation of the first aspect, the processor further comprises a matching processing unit configured to determine the instruction information from the one or more input frames; and the RISC-V processing unit is configured to convert the instruction information determined by the matching processing unit into the one or more RISC instructions.

The matching processing functions of an M&A processing stage may be integrated into the gateway controller by the device of the first aspect. This provides an efficient, but low complex, implementation of the processing circuitry of the device.

In an implementation of the first aspect, the one or more input frames comprise: one or more data frames including the data; and one or more instruction frames, wherein each instruction frame comprises an instruction, and wherein the one or more instructions of the one or more instruction frames constitute the instruction information.

The instruction frame and the data frame may be separated, and the instruction frame may indicate—as metadata—how the data frame should be processed by the one or more processing tasks.

In an implementation of the first aspect, the processor is configured to receive the one or more instruction frames and to determine the instruction information from the one or more instruction frames; and the one or more HWAs are configured to receive the one or more data frames and to execute the one or more processing tasks on the data in the one or more data frames.

This HW separation is beneficial in terms of performance and speed of the device.

In an implementation of the first aspect, the one or more HWAs are configured to output one or more processed data frames including processed data as a result of executing the one or more processing tasks on the data; and/or the processor is configured to perform one or more further processing tasks on the one or more instruction frames and to output as a result one or more processed instruction frames.

In an implementation of the first aspect, the one or more data frames are received in a data plane; and the one or more instruction frames are received in a control plane.

The separation into the control plane and the data plane through the two concurrent processing frames—i.e. the instruction (metadata) frame and the data frame-makes the device compatible with software defined networking (SDN) solutions.

In an implementation of the first aspect, each instruction frame comprises a header, a payload, and a trailer, and the payload of the instruction frame comprises the instruction.

In an implementation of the first aspect, the header and payload of the instruction frame comprises one or more of:

- a port number or ID where the respective input frame was received;
- a network type or protocol related to the respective input frame;
- a frame timestamp;
- a frame length;
- a frame priority;
- a number of bits of the input frame internally transferred per clock;
- a counter of matches or tasks and/or actions to be executed on that input frame;
- a gateway command or action to be executed on the input frame.

In an embodiment, the counter of matches may be filled in by the processing circuitry of the device.

In an implementation of the first aspect, each instruction frame comprises a length of the instruction and one or more parameters of the instruction as metadata of a respective data frame.

In an implementation of the first aspect, each input frame has or is derived from one of the following frame formats:

- Controller Area Network (CAN);
- CAN Flexible Data Rate;
- CAN XL;
- Local Interconnect Network;
- FlexRay;
- Media Oriented System Transport;
- Ethernet;
- Mobile Industry Processor Interface
- Camera Serial Interface 2.

The above include examples of frame formats that the device of the first aspect may handle. Other frame formats may be possible, and new frame formats may be added in the future. The device of the first aspect is able to use heterogeneous network protocols (not only Ethernet frames). The device may also operate on normalized frames, which may be normalized in the gateway controller, for example, by a frame normalizer (as shown in FIG. 2).

A second aspect of this disclosure provides a method for a gateway controller of a user equipment, the method comprising: receiving one or more input frames of bits, wherein the one or more input frames comprise data and comprise instruction information that indicates one or more processing tasks to be executed on the data; converting the instruction information into one or more RISC or CISC instructions selected from a RISC instruction set or a CISC instruction set, respectively; and executing the one or more processing tasks on the data based on the one or more RISC instructions or CISC instructions.

In an implementation form of the second aspect, the method comprises: converting, by a processor, the instruction information into the one or more RISC instructions or CISC instructions; and executing, by one or more hardware accelerators (HWAs), the one or more processing tasks on the data of the one or more input frames based on the one or more RISC instructions or CISC instructions received from the processor.

In an implementation of the second aspect, the method comprises providing a plurality of RISC instructions or a plurality of CISC instructions in parallel from the processor to a plurality of HWAs.

In an implementation of the second aspect, the method comprises, based on the one or more RISC instructions or CISC instructions: scheduling, by the processor, the execution of the one or more processing tasks by the one or more HWAs; and/or selecting, by the processor for each respective HWA of the one or more HWAs, one input frame of a subset of the input frames allocated to the respective HWA, to execute a processing task on the data of the selected input frame.

In an implementation of the second aspect, the method comprises scheduling, by the processor, the execution of the one or more processing tasks and/or selecting the one input frame for each respective HWA, by controlling one or more first multiplexers, wherein each first multiplexer is associated with one HWA, and wherein the one or more first multiplexers are controlled by one or more bits of the RISC instructions or CISC instructions.

In an implementation of the second aspect, the method comprises controlling, by the processor, a movement of the processed data, which results from executing the one or more processing tasks on the data of the one or more input frames, by controlling one or more second multiplexers, wherein each second multiplexer is associated with one or more HWAs, wherein the one or more second multiplexers are controlled by one or more bits of the RISC instructions or CISC instructions, and wherein the processed data is either moved towards an egress port of the device or is moved to one of the HWAs as data of another input frame.

In an implementation of the second aspect, the method comprises sequentially executing, one or more HWAs, two or more processing tasks on the data of the one or more input frames based on the one or more RISC instructions or CISC instructions received from the processor.

In an implementation of the second aspect, the method comprises converting, by the processor, the instruction information into the one or more RISC instructions, which are selected from a RISC-V instruction set.

In an implementation of the second aspect, the method further comprises determining, by the processor, the instruction information from the one or more input frames; and converting, by the processor, the instruction information determined by the matching processing unit into the one or more RISC instructions.

In an implementation of the second aspect, the one or more input frames comprise: one or more data frames including the data; and one or more instruction frames, wherein each instruction frame comprises an instruction, and wherein the one or more instructions of the one or more instruction frames constitute the instruction information.

In an implementation of the second aspect, the method comprises receiving, by the processor, the one or more instruction frames and to determine the instruction information from the one or more instruction frames; and receiving, by the one or more HWAs, the one or more data frames and to execute the one or more processing tasks on the data in the one or more data frames.

In an implementation of the second aspect, the method comprises outputting, by the one or more HWAs, one or more processed data frames including processed data as a result of executing the one or more processing tasks on the data; and/or performing, by the processor, one or more further processing tasks on the one or more instruction frames and to output as a result one or more processed instruction frames.

In an implementation of the second aspect, the one or more data frames are received in a data plane; and the one or more instruction frames are received in a control plane.

In an implementation of the second aspect, each instruction frame comprises a header, a payload, and a trailer, and the payload of the instruction frame comprises the instruction.

In an implementation of the second aspect, the header and payload of the instruction frame comprises one or more of:

- a port number or ID where the respective input frame was received;
- a network type or protocol related to the respective input frame;
- a frame timestamp;
- a frame length;
- a frame priority;
- a number of bits of the input frame internally transferred per clock;
- a counter of matches or tasks and/or actions to be executed on that input frame;
- a gateway command or action to be executed on the input frame.

In an implementation of the second aspect, each instruction frame comprises a length of the instruction and one or more parameters of the instruction as metadata of a respective data frame.

In an implementation of the second aspect, each input frame has or is derived from one of the following frame formats:

- Controller Area Network (CAN);
- CAN Flexible Data Rate;
- CAN XL;
- Local Interconnect Network;
- FlexRay;
- Media Oriented System Transport;
- Ethernet;
- Mobile Industry Processor Interface
- Camera Serial Interface 2.

The method of the second aspect and its implementation forms achieve the same advantages and effects as described above for the device of the first aspect and its respective implementation forms.

A third aspect of this disclosure provides a computer program comprising a program code for performing the method according to the method of the second aspect or any implementation form thereof, when executed by processing circuitry, for example by the processing circuitry of the device of the first aspect or any implementation form thereof.

It should be noted that all devices, elements, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of embodiments in relation to the enclosed drawings, in which.

DETAILED DESCRIPTION

Figure 1:
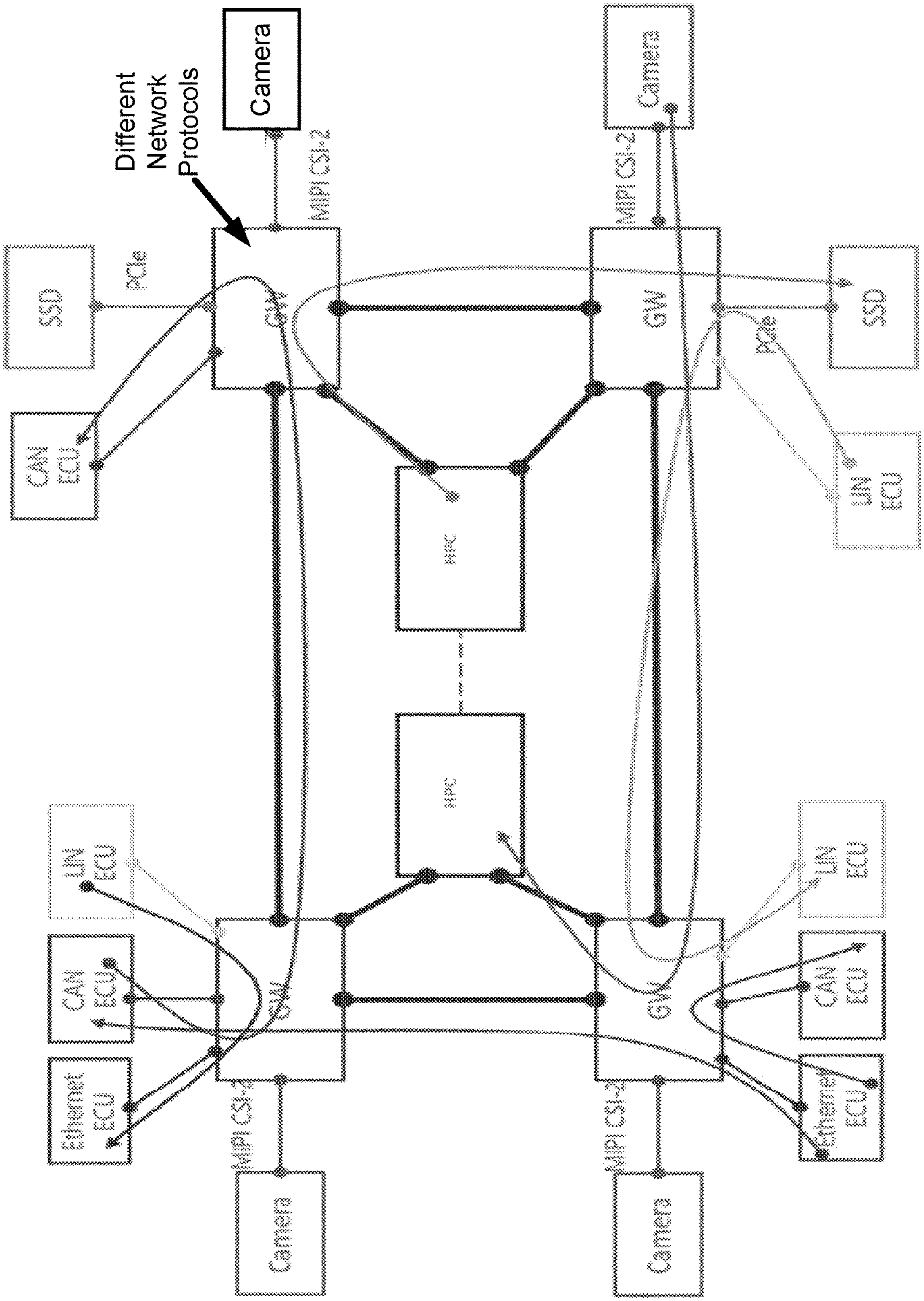
FIG. 1 shows an example of a zonal-based gateway that performs tunneling and routing of heterogeneous frames based on different network protocols.
Figure 3:
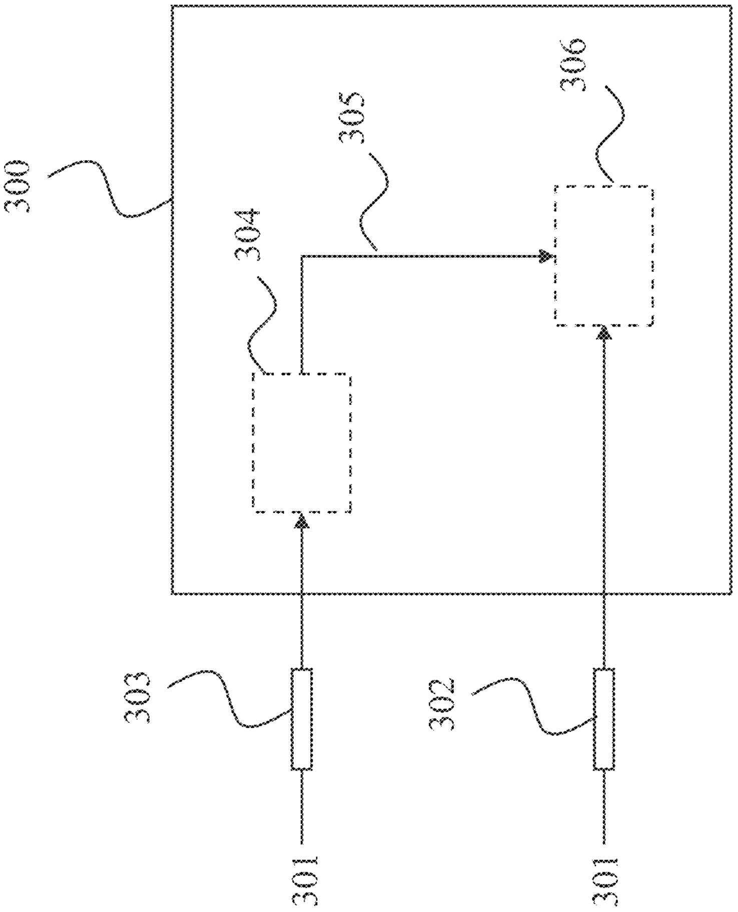
FIG. 3 shows a device for a gateway controller, according to an embodiment of this disclosure.

FIG. 3 shows a device 300 according to an embodiment of the present disclosure. The device 300 can be used in a gateway controller of a UE, for example in a gateway controller of a vehicle. The vehicle may, as an example, be a car, a truck, a train, a motorcycle, or an airplane. The gateway controller may be configured as a zonal gateway controller. That is, the gateway controller may be designed for a zonal-based gateway as shown as an example in FIG. 1.

Figure 2:
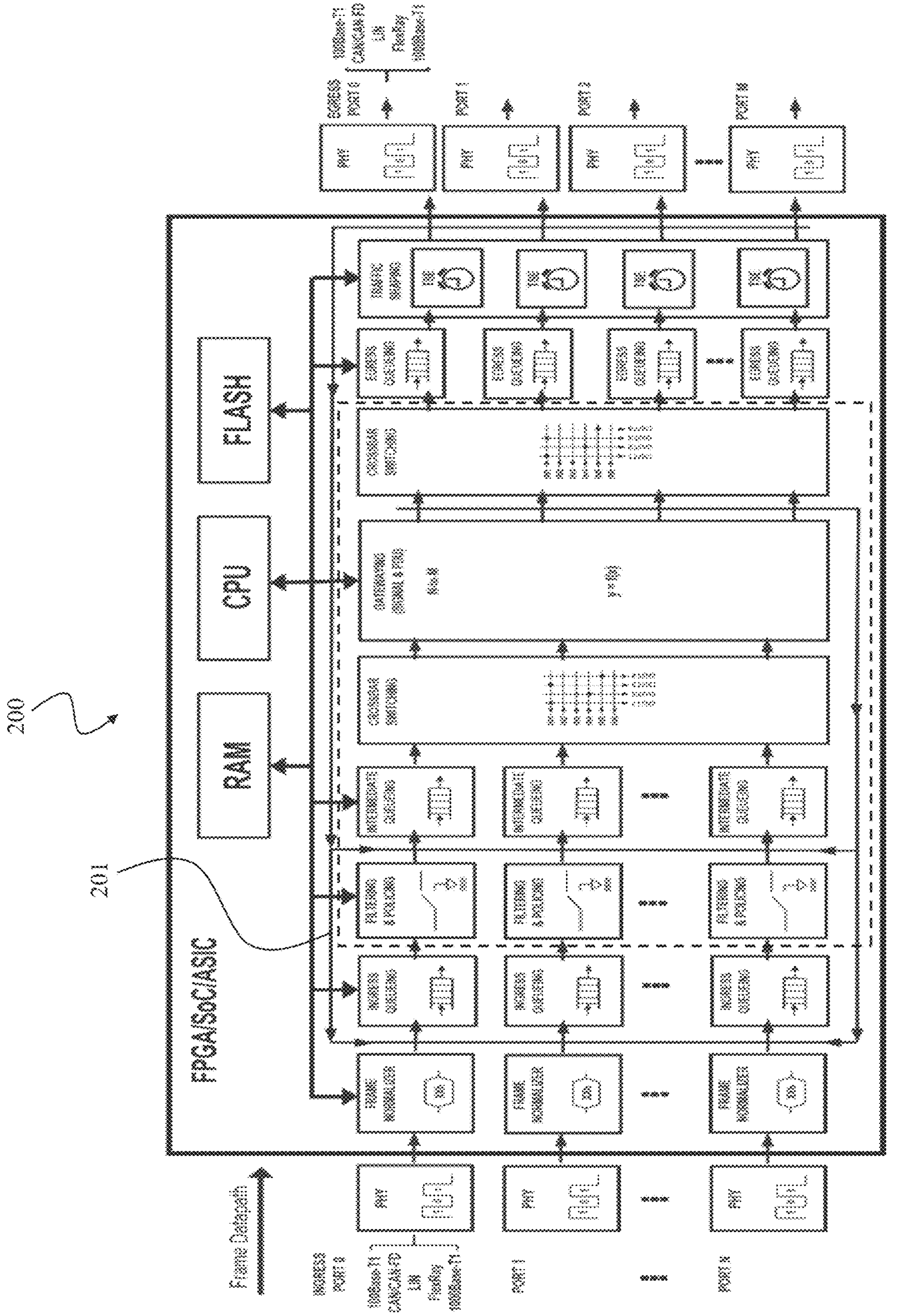
FIG. 2 shows schematically an eGW SoC device architecture according to this disclosure.

The device 300 may be configured to implement the "Filtering and Policing" and "Gatewaying" stages of the gateway controller 200 shown in FIG. 2 (see dashed box), for example, the device 300 may be configured to implement at least an action processing stage of an M&A processing stage 201 of the gateway controller 200, or may be configured to implement the entire M&A processing stage 201. Accordingly, the device 300 may comprise or be the "Gatewaying" stage, or may comprise or be the "Filtering & Policing" and the "Gatewaying" stage as shown in FIG. 2.

The device 300 comprises processing circuitry, which is configured to receive one or more input frames 301 of bits. The one or more input frames 301 comprise data 302 and comprise instruction information 303. Such input frames 301 may, respectively, be referred to as "data frames" and "instruction frames." Input frames 301 comprising both instruction information 303 and data 302 may also be received. The instruction information 303 may be formed by multiple instructions, which instructions may be spread over multiple input frames 301, for example, over multiple instruction frames. Likewise, the data 302 may be spread over multiple input frames 301, for example, over multiple data frames. The instruction information 303 indicates one or more processing tasks, which are to be executed on the data 302.

Each input frame 301 of the device 300 may have, or may be derived from, one of the following frame formats: CAN; CAN Flexible Data Rate; CAN XL; Local Interconnect Network; FlexRay; Media Oriented System Transport; Ethernet; Mobile Industry Processor Interface Camera Serial Interface 2. The input frames 301 may, however, also have a customized and/or normalized frame format. For example, the normalized frame format may have been generated by the gateway controller 200 (a stage before the device 300) by normalizing any of the above-listed frame formats.

The processing circuitry of device 300 is further configured to convert the instruction information 303 into one or more RISC instructions 305 or CISC instructions 305. The RISC instructions 305 or CISC instructions 305 are selected from a RISC instruction set or a CISC instruction set, respectively. For example, the device 300 may be configured to convert the instruction information 303 into one or more RISC-V instructions 305, which may be selected from an RISC-V instruction set. The processing circuitry of device 300 may, for example, comprise a processor 304 (optional in FIG. 3) to perform the conversion of the instruction information 303.

The processing circuitry of device 300 is further configured to execute the one or more processing tasks on the data 302 of the one or more input frames 301, wherein the execution is based on the one or more RISC instructions 304 or CISC instructions 304. That is, the RISC instructions 305 or CISC instructions 305 may be used to instruct which processing tasks are to be performed. The RISC or CISC instructions 305 may also be used to instruct, in which order and at what time the corresponding processing tasks are executed on the data 302. The processing circuitry may, for example, comprise one or more HWAs 306 (optional in FIG. 3) configured to execute the processing tasks. These HWAs 306 may be instructed by the processor 304, by use of the RISC or CISC instructions 305, to execute the processing tasks.

The processing circuitry of the device 300 may accordingly be configured to perform, conduct or initiate the various operations of the device 300 described herein. The processing circuitry comprises HW (e.g., the processor 304 and the HWAs 306), and may also be controlled by SW (e.g., for controlling the processor 304 to convert the instruction information 303 and to instruct the HWAs using the RISC or CISC instructions 305). The HW may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The device 300 may further comprise memory circuitry, which may store one or more commands that can be executed by the processing circuitry, for example, under control of software. For example, the commands can make the processing circuitry convert the instruction information 303. For instance, the memory circuitry may comprise a non-transitory storage medium storing executable software code (commands) which, when executed by the processing circuitry, causes operations of the device 300 to be performed. In one embodiment, the processing circuitry may comprise at least one processor 304 and a non-transitory memory connected to the processor 304. The non-transitory memory may carry executable program code which, when executed by the one or more processors, causes the device 300 to perform, conduct or initiate operations or methods described herein.

Figure 4:
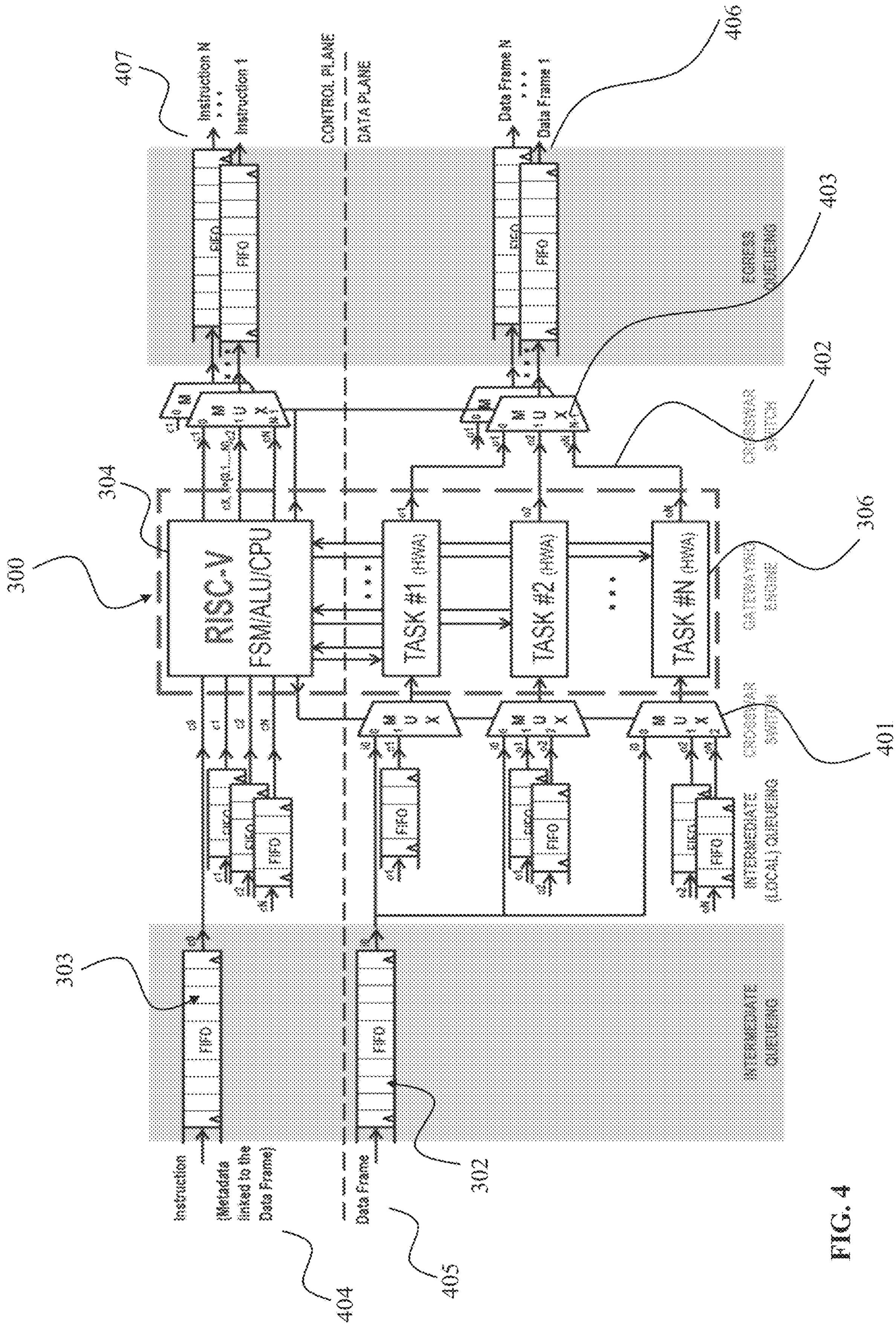
FIG. 4 shows a device for a gateway controller, according to an embodiment of this disclosure, which is based on a RISC-V architecture.

FIG. 4 shows a device 300 for a gateway controller, according to an embodiment of this disclosure, which builds on the embodiment shown in FIG. 3. Same elements in FIG. 3 and FIG. 4 are labelled with the same reference signs. FIG. 4 shows a device 300 that is based on an RISC architecture. That is, the device 300 of FIG. 4 uses an RISC instruction set, for example, a RISC-V instruction set.

The device 300 of FIG. 4 comprises the processor 304, which is configured to convert the instruction information 303 of the input frames 301 into the one or more RISC instructions 305 (here as example RISC-V instructions). Further, the device 300 comprises a plurality of the HWAs 306, which is configured to execute the one or more processing tasks on the data 302 of the one or more input frames 301, based on the one or more RISC instructions 305 received from the processor 304. The processor 304 may be configured to provide a plurality of the RISC instructions 305 in parallel to the plurality of HWAs 306, which may execute different processing tasks in parallel on the data 302.

FIG. 4 also shows that the device 300 can receive the one or more input frames 301 as one or more instruction frames 404 and a one or more data frames 405. For example, the processor 304 may receive the instruction frames 404. The processing circuitry may comprise one or more first in first out (FIFO) elements to provide the instruction frames 404 to the processor. The HWAs 306 may receive the data frames 405. The processing circuitry may comprise one or more first in first out (FIFO) elements to provide the data frames 405 to the HWAs. The processor 304 may be configured to determine the instruction information 303 from the instruction frames 404. The HWAs 306 are configured to execute the one or more processing tasks on the data 302 in the received data frames 405, according to the RISC instructions 305 used by the processor 304. The data frames 405 may be received in a data plane, and the instruction frames 404 may be received in a control plane. The device 300 may accordingly be designed for the data plane and the control plane. For example, the processor 304 may be arranged and/or may operate in the control plane, and the HWAs 306 may be arranged and/or may operate in the data plane. Thus, the device 300 may be SDN compliant.

By means of the device 300, as shown in FIG. 4, at least the action processing stage of the M&A processing stage 201 of the gateway controller 200 (i.e., the "Gatewaying" stage shown in FIG. 2) may be implemented. The device 300 may use the dedicated processor 304 (which may also be referred to as a RISC-V processor in this case). The processor 304 is able to execute custom RISC instructions 305, which may be designed to efficiently perform certain networking functions and/or primitives in an effective manner. For such a goal, the custom RISC instructions 305 may be intended to outperform networking primitives—like routing and/or forwarding, firewalling, intrusion detection, encryption and/or decryption—and may be created from scratch, for example, they may be appended to an instruction set architecture (ISA) of RISC-V as one or more extensions. That is, the RISC-V instructions 305 for the desired processing tasks can be selected from a RISC-V instructions set, and the RISC-V instruction set is configurable, for example, by the processor 304.

The set of the HWAs 306 may be designed to exploit efficient design characteristics, like parallelism and pipelining, as illustrated in FIG. 4. The combination of the custom RISC instructions 305 with custom HW of the processing circuitry allows to achieve an effective networking processing device 300 based on the RISC-V technology. For example, the processor 304 may be configured to schedule the execution of the one or more processing tasks by the one or more HWAs 306. As another example, the processor 304 may be configured to select, for each respective HWA 306, one input frame 301 of a subset of the input frames 301 allocated to the respective HWA 306, in order to execute a processing task on the data 302 of the selected input frame 301.

For instance, the processing circuitry of the device 300 may further comprise one or more first multiplexers 401 and/or may comprise one or more second multiplexers 403. Each first multiplexer 401 may be associated with one HWA 306 (on the input side of the HWA), and each second multiplexer 403 may be associated with one or more HWAs 306 (on the output side of the HWA). The processor 304 may control the one or more first multiplexers 401 and/or may control the one or more second multiplexers 403. For example, the multiplexers 401, 403 may be controlled by one or more bits of the RISC instructions 305. For example, the processor 304 can schedule the execution of the one or more processing tasks and/or can select the one input frame 301 for each respective HWA 306, by controlling the one or more first multiplexers 401 using the RISC instructions 305. As another example, the processor 304 can control a movement of processed data 402, which results from executing the one or more processing tasks on the data 302, by controlling the one or more second multiplexers 403 using the RISC instructions 305. For example, the processed data 402 may be moved towards an egress port of the device 300, e.g. in order to output the processed data 402 to a next stage of the gateway controller 200. To this end, the processed data 402 may be moved as processed data frames 406 into one or more FIFO elements as shown in FIG. 4. Alternatively, the processed data 402 may be moved (looped) back to one of the HWAs 306, as (new) data input or new data frame 405 into the HWA 306. In this way, the HWAs 306 are enabled to sequentially execute not only one, but two, three, or more processing tasks on the data 302 of the one or more input frames 301. These further processing tasks may again be executed based on the RISC instructions 305 provided by the processor 304.

The instruction information 303 in the instruction frames 404 may be converted by the processor 304, at run-time of the device 300, into parallel RISC instructions 305, which may correspond parallel processing tasks, respectively. Notably, the processing tasks may be deployed directly in HW by means of the HWAs 306. Each HWA 306 may be configured to perform a different type of processing task. However, a HWA 306 may also be capable of performing more than one type of processing task. The processor 304 may also handle input and output crossbars (e.g., including the first multiplexers 401 and the second multiplexers 403), which may be connected before and after the HWAs 306, as depicted in FIG. 4. The processor 304 can take control not only on the parallelism of HW, but also of the execution of processing tasks in a pipeline. For example, execution of processing tasks can be pipelined through the handling of the select lines of the multiplexers 401 and 403 (MUX) connected respectively in the inputs and outputs of the HWAs 306 (which may also be referred to as TASK coprocessors). All control lines are in HW, and may be controlled by the processor 304 through the RISC instructions 305, e.g., through some of the bits of each custom RISC instruction word.

In embodiments, the processor 304 may provide output. For example, the processor 304 may be configured to perform one or more further processing tasks on the one or more instruction frames 404, and may output as a result one or more processed instruction frames 407. These processed instruction frames 407 may, for example, be provided to one or more FIFO elements as shown, and from there to one or more further stages of the gateway controller 200 (see, e.g., FIG. 2).

The present disclosure is compliant with the SDN approach. That is, the device 300 is designed in a way that permits the decoupling of the control plane and the data plane, for example, by the above-mentioned decomposition of each input frame 301 into two frames, namely the instruction frame 404 and the data frame 405. Each instruction frame 404 may also comprises a length of the instruction, and may comprise one or more parameters of the instruction as metadata of a respective data frame 405.

It should be noted that, given an input frame 301, its decomposition in both instruction frame 404 and data frame 405 may yield two frames that move synchronously, i.e. at the same time, through both the control plane and the data plane, respectively, from one stage to another of the gateway.

Figure 5:
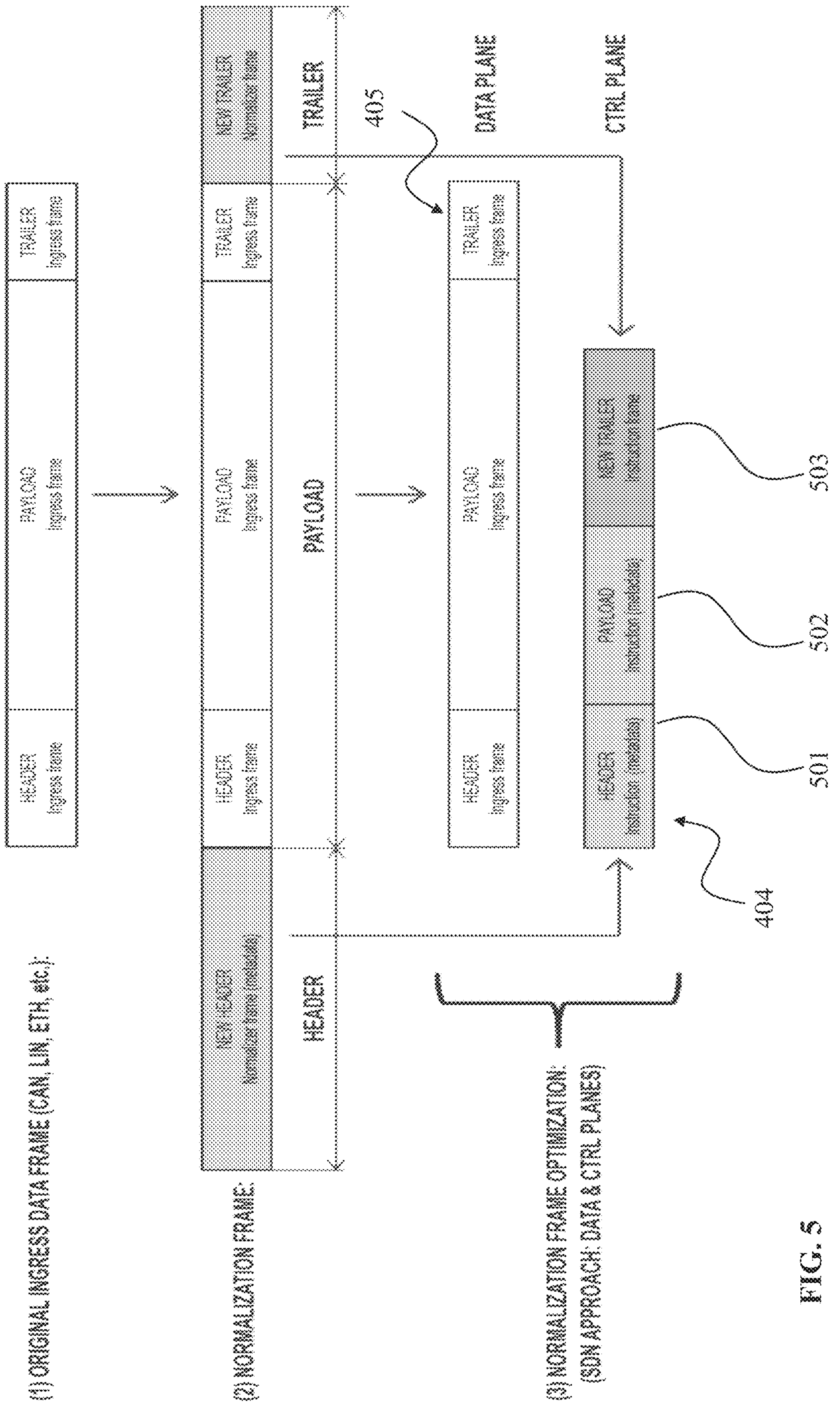
FIG. 5 illustrates a decomposition of an input frame of the device into a data frame and an instruction frame (respectively, in data plane and control plane).

As shown in FIG. 5, an instruction frame 404 may comprise a header 501, a payload 502, and a trailer 503. The payload 502 of the instruction frame 404 may comprise an instruction (which may be the instruction information 303 if there is only one instruction frame 404; in case of more than one instruction frame 404, the instructions in all of these instruction frames 404 may constitute the instruction information 303). The instruction frame 404 may be generated inside the gateway controller, and may be composed of metadata fields of an input frame 301 (which may also have been processed by previous stages of the gateway controller). The data frame 405 may comprise or consist of the original input frame 301 itself. The header 501 and payload 502 of the instruction frame 404 may comprise one or more of: a port number or ID where the respective input frame 301 was received; a network type or protocol related to the respective input frame 301; a frame timestamp; a frame length; a frame priority; a number of bits of the input frame 301 internally transferred per clock; a counter of matches or tasks and/or actions to be executed on that input frame 301; a gateway command or action to be executed on the input frame 301.

There are many advantages of the device 300 of FIG. 4. For instance, in relation to SW, the custom instruction extension of RISC-V ISA may be exploited and provide high flexibility. With respect to HW, the networking HWAs 306 may take advantage of data flow parallelism. Further, with respect to networking (NW), heterogeneous network technologies and/or different network protocols may be handled by the device 300. The device 300 may also be based on a scalable solution of affordable complexity. Also the device 300 may support easy automatization of, for instance, the eGW architecture shown in FIG. 2.

The device 300 can generally enable an efficient implementation and deployment of an action processing stage or an M&A processing stage of whatever networking device, from gateway to router to switch or bridge to smartNIC or even (I) IoT (Internet of Things) end devices.

The RISC-V processor 304 may solve the arbitration of input frames 301, coming in parallel from input ports of the device 300, which may be codified through internal instruction frames 404. The one or more processing tasks may be executed in real time on the HWAs, which may be a set of shared resources integrated in the device 300 as a kind of coprocessors to the processor 304. The HWAs 306 may be directly interconnected to the processor 304, where the RISC instructions 305 are converted and executed. The combination of the RISC instructions 305 generated in the processor 304 and deployed through the HWAs 306 make this solution effective, flexible and fully scalable. To this aim, the device 300 may be decomposed in central processing unit (CPU), arithmetic logic unit (ALU), finite state machine (FSM) to run software, and the HWAs 306 (or coprocessors) to execute those RISC instructions 305 in customized HW, manipulate at the same time parallel inputs and generates parallel outputs, all of them related to networking frames.

Figure 6:
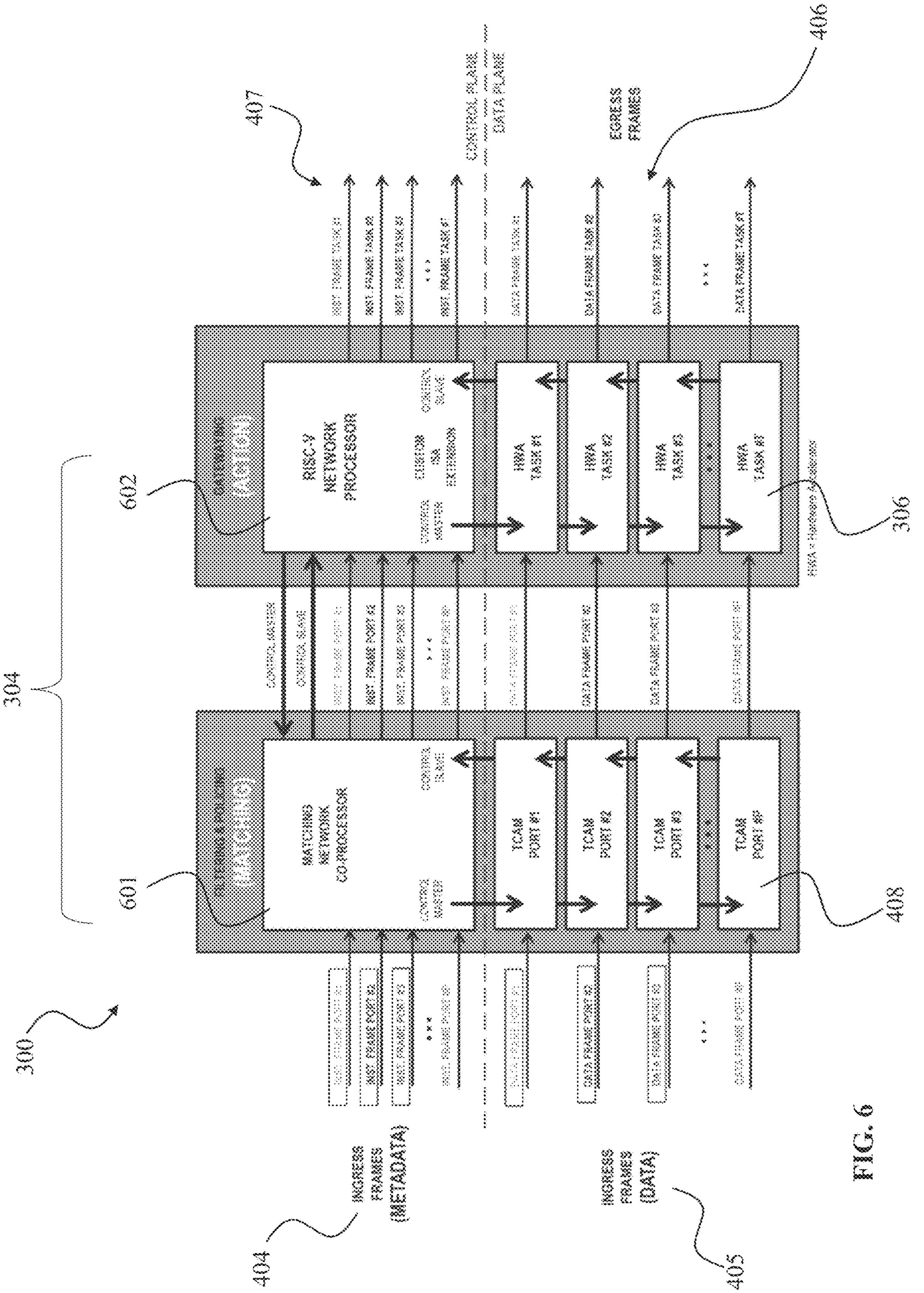
FIG. 6 shows a device according to an embodiment of this disclosure with a processor that is based on a RISC-V architecture.

FIG. 6 shows a device 300 according to an embodiment of this disclosure, which builds on the embodiment shown in FIG. 4. Same elements in FIG. 4 and FIG. 6 are labelled with the same reference signs and may function likewise. For instance, FIG. 6 shows that the device 300 may comprise a processor 304 based on a RISC-V architecture. The device 300 of FIG. 6 is compliant with the SDN approach. To this end, for the device 300 of FIG. 6, every input frame 301 is decomposed into instruction frame 404 and data frame 405.

Both the instruction frame 404 and the data frame 405 of a given input frame 301 may move synchronously back and forth inside the different processing stages of the gateway shown in FIG. 2 and FIG. 4. For instance, when a frame is processed in the "Gatewaying" stage and the resulting processed frame is recirculated back to the "Filtering and Policing" stage through the loopback strategy, then both the instruction frame 404 and the data frame 405 of the processed frame are sent back at the same time.

The processor 304 of the device 300 of FIG. 6 comprises a matching processing unit 601 and a RISC-V processing unit 602. The matching processing unit 601 is configured to determine the instruction information 303 from the one or more input frames 301, for example, from the one or more instruction frames 404. Thereby, it may interact with ternary content-addressable memory (TCAM) elements 408. The RISC-V processing unit 602 is configured to convert the instruction information 303 determined by the matching processing unit 601 into one or more RISC-V instructions 305, which are selected from a RISC-V instruction set, and to instruct the HWAs 306. The RISC-V processing unit 305 may output the processed instruction frames 407. The HWAs 306 may output the processed data frames 406. Accordingly, the device 300 may implement the matching processing stage of an M&A processing stage of the gateway controller. For instance, the device 300 may implement the M&A processing stage 201 shown in FIG. 2.

Figure 7:
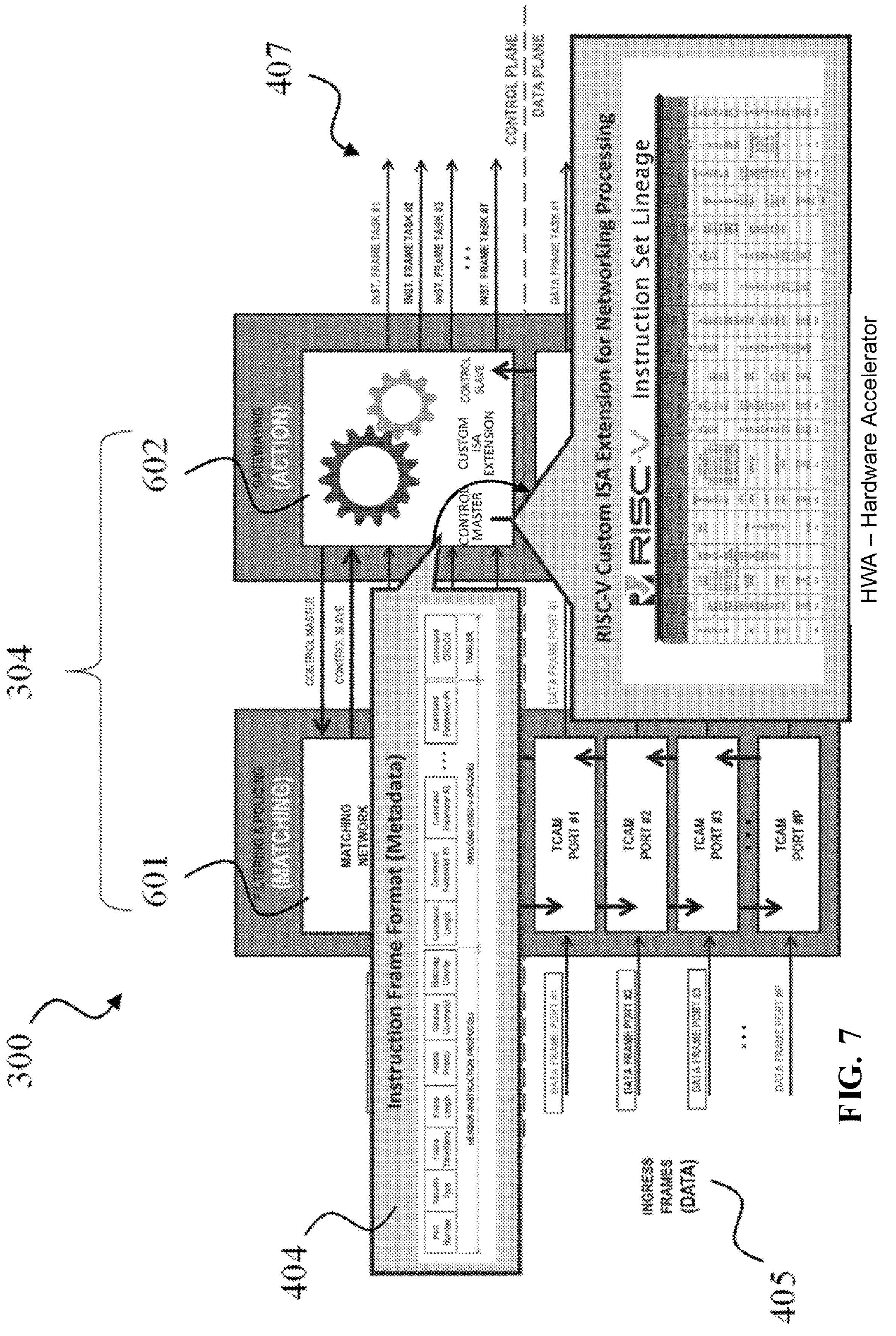
FIG. 7 illustrates a transformation of an instruction frame into a RISC-V custom instruction in the device of FIG. 6.
Figure 8:
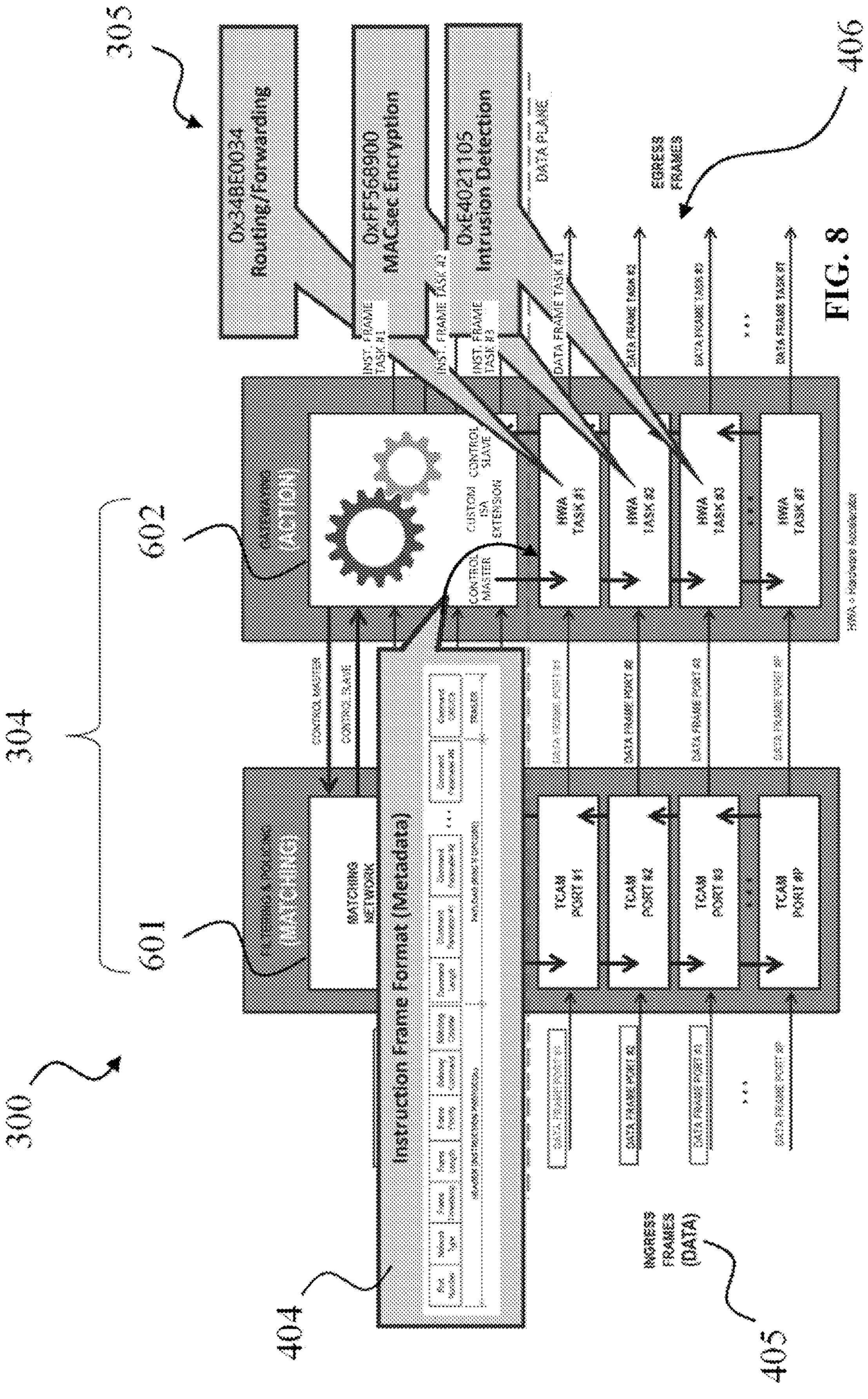
FIG. 8 illustrates an execution of a RISC-V custom instruction (word) on a specific HWA (specific processing task) in the device of FIG. 6

FIGS. 7 and 8 show that the instruction frame 404, for example, the instruction included therein, related to an input frame 301, may be converted into a specific RISC-V instruction 305, so that the one HWA 306 taking charge of a processing task (TASK) decodified from the instruction frame 404, is able to efficiently perform the processing task. For instance, different RISC instructions 305 (here three example words are shown on the right side) selected from the RISC-V instruction set may be used to instruct HWAs 306 to respectively perform routing/forwarding, encryption (e.g., MACsec encryption), and/or intrusion detection, on the data frames 405.

The RISC-V processing unit 602 is configured to control the matching processing unit 601 (which may function as a TCAM-based filtering and policing stage) and also the different HWAs 306 where the processing tasks (action stage) are deployed. The RISC-V processing unit 602 may also be configured to handle the arbitration of frames in both inputs and outputs, for example, by controlling the select lines of the multiplexers 401 and 403, which may be present in the crossbars, thus taking charge of the complete M&A processing stage.

With this device 300, many of the typical network functions or primitives can be implemented in a simple, flexible and scalable way, e.g. routing/forwarding, access control list (ACL) and/o firewalling (L2, L3, L4), network intrusion detection, etc. The main advantage of this device 300 is the fact its specific system architecture may meet any of the possible networking processing needs that a networking device could need. This solution exploits three design dimension: parallelism, pipeline and loopback. For parallelism, different input frames 301 may be processed in parallel in the stack of HWAs 306, where each HWA 306 may be devoted to a particular networking task. For pipeline, given an input frame 301, it is possible to submit this frame 301 to a sequence of processing tasks thanks to the flexible architecture of crossbars. For loopback, any input frame 301 can be moved back and forth along the processing stages of the gateway controller (e.g., as in FIG. 2), also through the filtering and policing and gatewaying stages of the proposed RISC-V M&A processing stage.

Alternative implementations of the present disclosure could perform the same network processing with conventional RISC (e.g. ARM) instead of RISC-V, or with CISC (e.g. x86). That is, the processor 304 may be configured to use RISC, RISC-V, or CISC instruction sets. Other combinations are also possible.

Embodiments of the present disclosure can be adopted across many fields, domains, and industries like automotive IVN systems, gateway controllers, enterprise routers/bridges, smartNICs, IIOT end nodes in industrial and smart manufacturing fields, or cloud infrastructures, etc.

Figure 9:
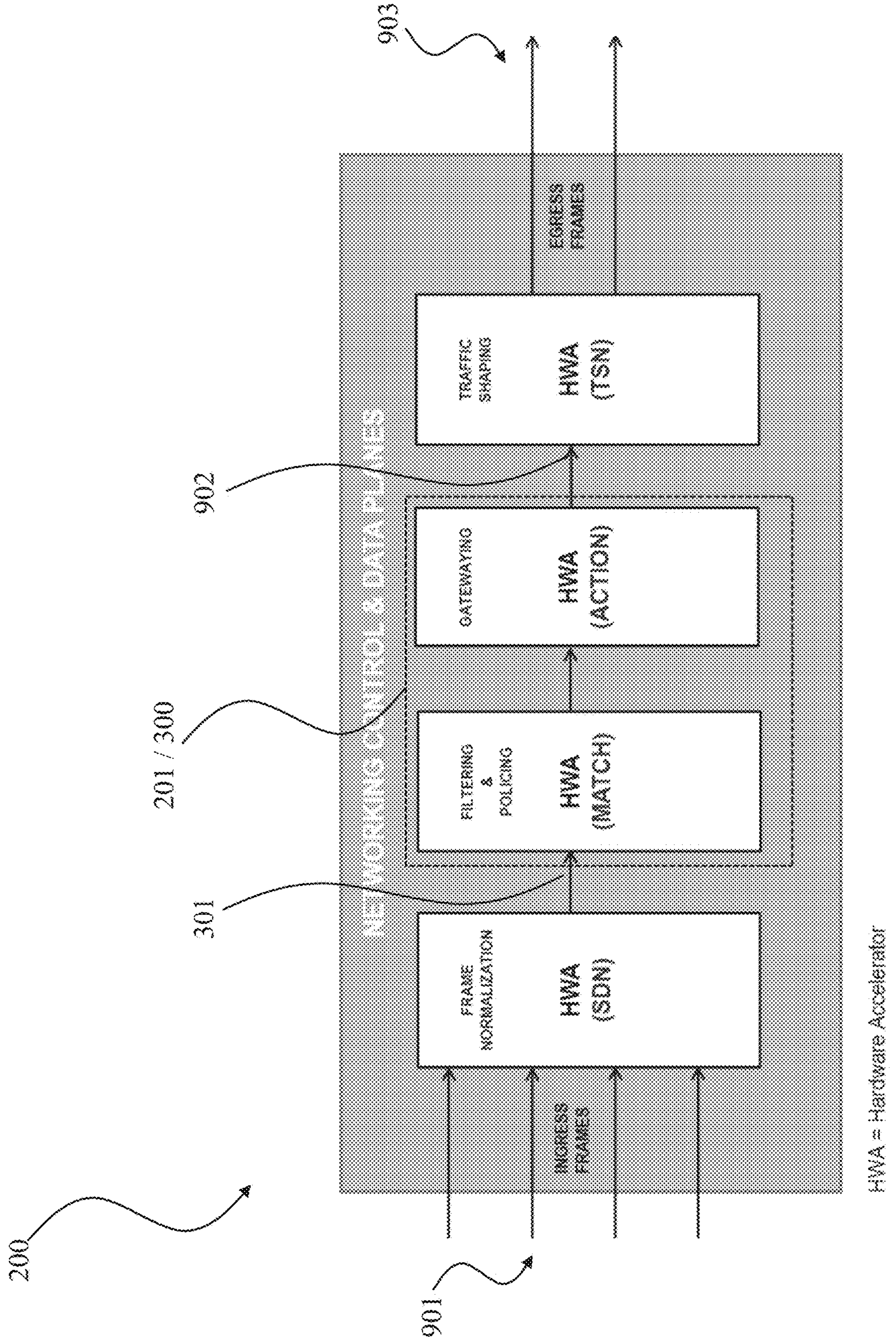
FIG. 9 shows a simplified high-level view of the eGW SoC architecture of FIG. 2.

The eGW SoC architecture shown in FIG. 2 is shown simplified through a functional view in FIG. 9. The present disclosure provides the two central processing of the eGW architecture, i.e., the M&A processing stage 201. The M&A processing stage 201 may comprise the device 300, as shown in FIG. 9. The M&A processing stage 201 may be designed according to SDN paradigm. The controller 200 may receive ingress frames 901, which may be of different frame formats, and may be converted into the input frames 301 to the device 300 implementing the M&A processing stage 201. The device 300 may output processed frames 902, e.g., the processed data frames 406 and the processed instruction frames 407, which may become egress frames 903 when output by the controller 200.

Figure 10:
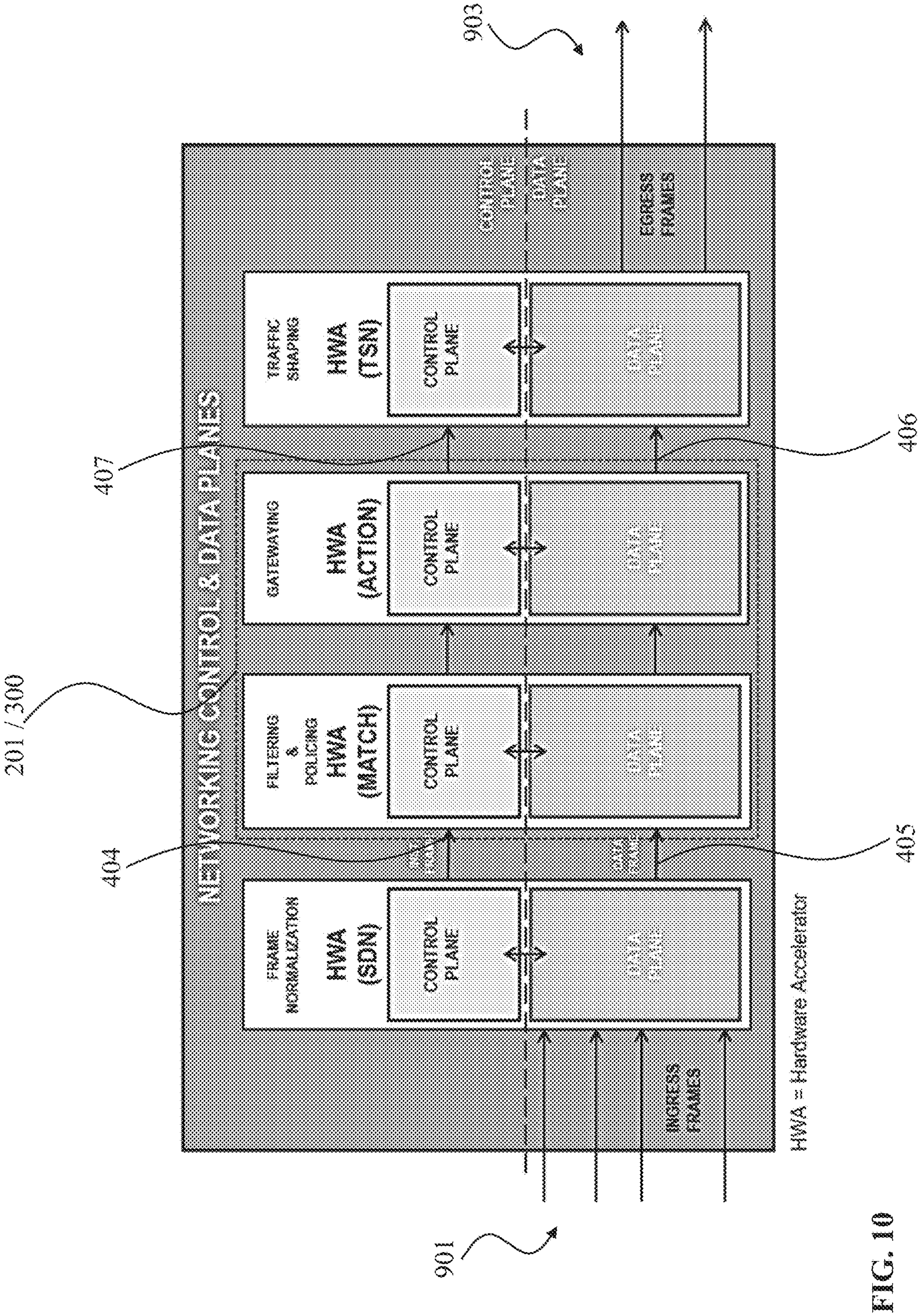
FIG. 10 shows a simplified SDN-compliant high-level view of the eGW SoC architecture of FIG. 9.

Further, the block diagram of FIG. 9 can be reworked as illustrated in FIG. 10. The present disclosure includes a solution of two central processing stages implemented by the device 300, which can include the RISC-V technology as an option.

Figure 11:
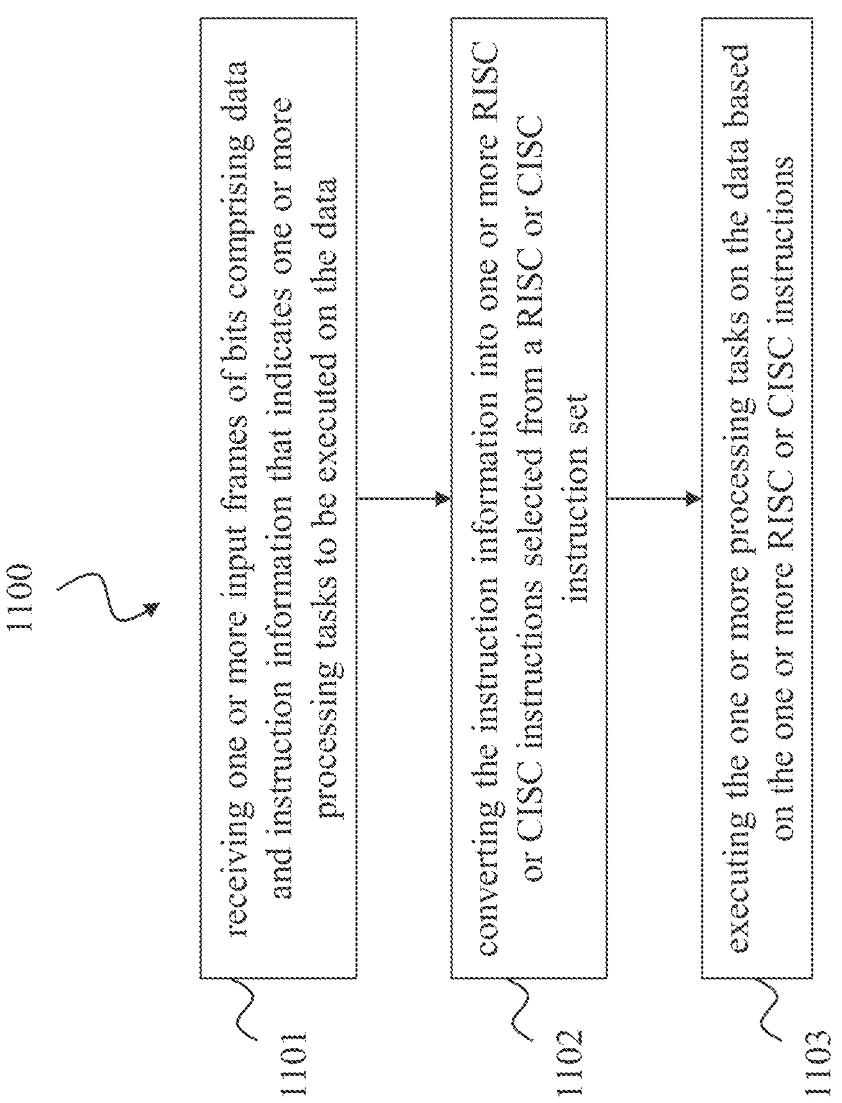
FIG. 11 shows a method, according to an embodiment of this disclosure, for a gateway controller of a UE.

FIG. 11 shows a method 1100 for a gateway controller 200 of a UE according to an embodiment of the present disclosure. The method 1100 may be performed by the device 300. The method 1100 comprises a step 1101 of receiving one or more input frames 301 of bits, wherein the one or more input frames 301 comprise data 302 and comprise instruction information 303 that indicates one or more processing tasks to be executed on the data 302. The method 1100 further comprises a step 1102 of converting the instruction information 303 into one or more RISC instructions 305 or CISC instructions 305 selected from a RISC instruction set or a CISC instruction set, respectively. Further, the method 1100 comprises a step 1103 of executing the one or more processing tasks on the data based on the one or more RISC instructions 305 or CISC instructions 305.

The overall benefit and advantages of this disclosure, the device 300, and the eGW controller 200, which target a high-performance solution that is flexible and scalable by design, can be summarized as:

- Network DIVERSITY: Embracing heterogeneous network protocols (not only Ethernet frames) through PDU Normalizer Engine
- SDN-compliant SIMPLICITY: Separation of control plane and data plane through two concurrent processing frames: instruction (metadata) frame and data frame as result of the normalization process for the heterogeneous networks
- RISC (e.g. ARM) vs CISC (e.g. x86) ISA: Complexity reduced through fixed size instructions.
- INTERNAL storage/buffering memory: On-chip memory only (off-chip DDRx memory not required!)
- FLEXIBLE interconnects and data flow: Elastic & Smart Queueing Engine and crossbars. Stages split in different clock domains.
- LOOPBACK strategy: Capability to move frames back and forth across stages of the device with nearly zero time overhead thanks to the internal priority handling of frames and the inherent parallelism and pipelining system structure
- Processing Flow SIMPLICITY: Single Matching (Filtering & Policing) Stage and Action Stage (Gatewaying) across the data flow
- TSN-centric ARCHITECTURE: Time determinism guaranteed by design through the Traffic Shaper Engine (TSE). Time handling located in the last stage of the chain
- Architecture build AUTOMATION: Automated toolchain able to build the SoC architecture based on a library of modular IP cores
- System CONFIGURABILITY: Host CPU with full WR/RD access to the memory map (configuration registers) of each HWA (as peripheral)
- ALL-IN-ONE GW Concept: Overall, the eGW architecture is flexible and scalable while keeping its level of complexity under control thanks to innovative abstraction layers deployed through its library of ultra-parameterized HWAs (parameterized interfaces, data types, memory sizes, memory map addresses, geometries, shapes, dimensions, capabilities, features and functions!)

The present disclosure has been described in conjunction with various embodiments as examples as well as implementations. However, other variations can be understood and effected by those persons skilled in the art and practicing the claimed matter, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for a gateway controller of a user equipment, the device comprising processing circuitry configured to:

receive one or more input frames of bits, wherein the one or more input frames comprise data and instruction information that indicates one or more processing tasks to be executed on the data;

convert the instruction information into one or more Reduced Instruction Set Computer (RISC) instructions or one or more Complex Instruction Set Computer (CISC) instructions, the one or more RISC instructions selected from an RISC instruction set, and the one or more CISC instructions selected from an CISC instruction set; and execute the one or more processing tasks on the data of the one or more input frames based on the one or more RISC instructions or the one or more CISC instructions, wherein the processing circuitry comprises:

a processor configured to convert the instruction information of the input frames into the one or more RISC instructions or the one or more CISC instructions, wherein the processor comprises a RISC-V processing unit configured to convert the instruction information into the one or more RISC instructions selected from an RISC-V instruction set; and one or more hardware accelerators (HWAs) configured to execute the one or more processing tasks on the data of the one or more input frames based on the one or more RISC instructions or the one or more CISC instructions received from the processor.

2. The device according to claim 1, wherein the one or more input frames comprise:

one or more data frames including the data; and one or more instruction frames, wherein each instruction frame comprises an instruction, and wherein the one or more instructions of the one or more instruction frames constitute the instruction information.

3. The device according to claim 2, wherein:

the processor is further configured to receive the one or more instruction frames and to determine the instruction information from the one or more instruction frames; and the one or more HWAs are configured to receive the one or more data frames and to execute the one or more processing tasks on the data in the one or more data frames.

4. The device according to claim 3, wherein:

the one or more HWAs are configured to output one or more processed data frames including processed data as a result of executing the one or more processing tasks on the data; and/or the processor is further configured to perform one or more further processing tasks on the one or more instruction frames and to output as a result one or more processed instruction frames.

5. The device according to claim 2, wherein each instruction frame comprises a header, a payload, and a trailer, and the payload of the instruction frame comprises the instruction.

6. The device according to claim 5, wherein the header and payload of the instruction frame comprises one or more of:

a port number or ID where the respective input frame was received;

a network type or protocol related to the respective input frame;

a frame timestamp;

a frame length;

a frame priority;

a number of bits of the input frame internally transferred per clock;

a counter of matches or tasks and/or actions to be executed on that input frame;

a gateway command or action to be executed on the input frame.

7. The device according to claim 2, wherein:

the one or more data frames are received in a data plane; and the one or more instruction frames are received in a control plane.

8. The device according to claim 2, wherein each instruction frame comprises a length of the instruction and one or more parameters of the instruction as metadata of a respective data frame.

9. The device according to claim 1, wherein the processor is further configured to, based on the one or more RISC instructions or the one or more CISC instructions:

schedule the execution of the one or more processing tasks by the one or more HWAs; and/or select, for each respective HWA of the one or more HWAs, one input frame of a subset of the input frames allocated to the respective HWA, to execute a processing task on the data of the selected input frame.

10. The device according to claim 9, wherein the processor is further configured to schedule the execution of the one or more processing tasks and/or select the one input frame for each respective HWA, by controlling one or more first multiplexers of the processing circuitry, wherein each first multiplexer is associated with one HWA, and wherein the one or more first multiplexers are controlled by one or more bits of the one or more RISC instructions or the one or more CISC instructions.

11. The device according to claim 1, wherein the processor is further configured to control a movement of the processed data, which results from executing the one or more processing tasks on the data of the one or more input frames, by controlling one or more second multiplexers of the processing circuitry, wherein each second multiplexer is associated with the one or more HWAs, wherein the one or more second multiplexers are controlled by one or more bits of the one or more RISC instructions or the one or more CISC instructions, and wherein the processed data is either moved towards an egress port of the device or is moved to one of the HWAs as data of another input frame.

12. The device according to claim 11, wherein the one or more HWAs are configured to sequentially execute two or more processing tasks on the data of the one or more input frames based on the one or more RISC instructions or the one or more CISC instructions received from the processor.

13. The device according to claim 1, wherein the processor is further configured to provide a plurality of RISC instructions or a plurality of CISC instructions in parallel to a plurality of HWAs.

14. The device according to claim 1, wherein:

the processor further comprises a matching processing unit configured to determine the instruction information from the one or more input frames; and the RISC-V processing unit is configured to convert the instruction information determined by the matching processing unit into the one or more RISC instructions.

15. The device according to claim 1, wherein each input frame of the one or more input frames has or is derived from one of the following frame formats:

Controller Area Network, CAN;

CAN Flexible Data Rate;

CAN XL;

Local Interconnect Network;

FlexRay;

Media Oriented System Transport;

Ethernet;

Mobile Industry Processor Interface

Camera Serial Interface 2.

16. A non-transitory computer-readable storage medium comprising program code, which upon being executed by processing circuitry, provide for performance of a method comprising:

receiving one or more input frames of bits, wherein the one or more input frames comprise data and instruction information that indicates one or more processing tasks to be executed on the data;

converting the instruction information into one or more Reduced Instruction Set Computer (RISC) instructions or Complex Instruction Set Computer (CISC) instructions, the one or more RISC instructions selected from an RISC instruction set, and the one or more CISC instructions selected from an CISC instruction set;

executing the one or more processing tasks on the data based on the one or more RISC instructions or the one or more CISC instructions;

converting, by a processor of the processing circuitry, the instruction information of the input frames into the one or more RISC instructions or the one or more CISC instructions, wherein the processor comprises a RISC-V processing unit configured to convert the instruction information into the one or more RISC instructions selected from an RISC-V instruction set; and executing, by one or more hardware accelerators (HWAs) of the processing circuitry, the one or more processing tasks on the data of the one or more input frames based on the one or more RISC instructions or the one or more CISC instructions received from the processor.

17. The non-transitory computer-readable storage medium of claim 16, wherein the processor is further configured to provide a plurality of RISC instructions or a plurality of CISC instructions in parallel to a plurality of HWAs.

18. The non-transitory computer-readable storage medium of claim 16, wherein the one or more input frames comprise:

one or more data frames including the data; and one or more instruction frames, wherein each instruction frame comprises an instruction, and wherein the one or more instructions of the one or more instruction frames constitute the instruction information.

19. A method for a gateway controller of a user equipment, the method comprising:

receiving one or more input frames of bits, wherein the one or more input frames comprise data and instruction information that indicates one or more processing tasks to be executed on the data;

converting the instruction information into one or more Reduced Instruction Set Computer (RISC) instructions or one or more Complex Instruction Set Computer (CISC) instructions, the one or more RISC instructions selected from an RISC instruction set, and the one or more CISC instructions selected from an CISC instruction set;

executing the one or more processing tasks on the data based on the one or more RISC instructions or the one or more CISC instructions;

converting, by a processor, the instruction information of the input frames into the one or more RISC instructions or the one or more CISC instructions, wherein the processor comprises a RISC-V processing unit configured to convert the instruction information into the one or more RISC instructions selected from an RISC-V instruction set; and executing, by one or more hardware accelerators (HWAs), the one or more processing tasks on the data of the one or more input frames based on the one or more RISC instructions or the one or more CISC instructions received from the processor.

* * * * *